United States Patent [19]

Fujiwara et al.

[11] Patent Number: 5,741,198
[45] Date of Patent: Apr. 21, 1998

[54] TOOTHED BELT

[75] Inventors: Toru Fujiwara, Tokorozawa; Yoshinori Itoh, Hanno; Masato Tomobuchi, Sakado, all of Japan

[73] Assignee: Tsubakimoto Chain Co., Osaka, Japan

[21] Appl. No.: 558,751

[22] Filed: Nov. 20, 1995

[30] Foreign Application Priority Data

Nov. 22, 1994 [JP] Japan ................................. 6-311294

[51] Int. Cl.$^6$ ................................................. F16G 1/28
[52] U.S. Cl. ................................................. 474/271
[58] Field of Search ................................. 474/202, 204, 474/205, 237, 266, 268, 271

[56] References Cited

U.S. PATENT DOCUMENTS

| | | |
|---|---|---|
| 3,784,427 | 1/1974 | Griffin . |
| 4,012,332 | 3/1977 | Behrens ................................. 252/182 |
| 5,342,252 | 8/1994 | Fujiwara et al. ..................... 474/266 |
| 5,387,160 | 2/1995 | Nakajima et al. .................... 474/205 |
| 5,569,719 | 10/1996 | Hayashi et al. ..................... 525/329.3 |

FOREIGN PATENT DOCUMENTS

| | | |
|---|---|---|
| 0 319 320 | 6/1989 | European Pat. Off. . |
| 0 344 350 | 12/1989 | European Pat. Off. . |
| 43 10 588 A | 12/1993 | Germany . |
| 63-270753 | 11/1988 | Japan . |
| 1-269743 | 10/1989 | Japan . |
| 3-255246 | 11/1991 | Japan . |

OTHER PUBLICATIONS

HOOK, Advantages of the use of ultra–accelerators in rubber acceleration, Hule Mex. Plast., 8–10, Dec. 1983.

Primary Examiner—Roger J. Schoeppel
Attorney, Agent, or Firm—Armstrong, Westerman, Hattori, McLeland & Naughton

[57] ABSTRACT

A toothed belt includes a back rubber in which is embedded a tensile body, and toothed rubber, wherein a toothed sheet is glued on an exposed toothed surface of the toothed rubber. The back rubber and the toothed rubber are formed such that a rubber composition, which compounds partial hydrogenated nitrile rubber with iodine having a value of from 12 to 20, a sulfur-based crosslinking agent and a vulcanization accelerator, is cured and molded, wherein a vulcanization accelerator is compounded in a specified ratio of tellurium dithiocarbamate compound, zinc dithiocarbamate compound, tetramethylthiuram disulfide and tetraethylthiuram disulfide.

3 Claims, 2 Drawing Sheets (CONDITION OF TEST A)

A : FLAT PULLEY
P : TOOTHED PULLEY
W : WEIGHT (CONSTANT)
BELT : 124 TEETH (8mm PITCH)
NUMBER OF REVOLUTION : 4000r/min
TEMPERATURE : 140°C (CONDITION OF TEST B)
LOAD : CONSTANT
TEMPERATURE : 100°C
WIDTH OF TOOTH OF BELT : CONSTANT

TOOTHED BELT

BACKGROUND OF THE INVENTION

The present invention relates to a toothed belt for a power transmission device, and more particularly pertains to a new and improved toothed belt for driving a cam shaft of an automobile engine.

A toothed belt is used for transmitting power, especially for driving a cam shaft of an automobile engine. Normally, the toothed belt for driving a cam shaft of an automobile is used under an atmosphere of high temperature and high tension. Under such conditions, the toothed belt must have the performance of a regular non-tooth belt, such as good thermal resistance characteristics and characteristics to reduce possible tooth breakage.

Through observation of the change of the physical properties of the toothed belt during use, it is found that the rubber on the back of the toothed belt is first cured and then cracked. The cracking may be due to the curing of the rubber, a decrease in strength of the rubber or elongation of the rubber.

In order to prevent the rubber on the back of the toothed belt from cracking, it has been considered to use a rubber of a predetermined hardness at a low level and to maintain the elongation of the rubber on the back of the toothed belt during curing of the rubber. However, if a rubber of a predetermined hardness at a low level is used, the toothed belt will most likely deform, causing the other characteristics necessary for good performance of the toothed belt to possibly be degraded. For example, the characteristic of the reduction of possible tooth breakage may be degraded or the longevity of the rubber on the back of the toothed belt may be considerably shortened.

In order to prevent the rubber on the back of the toothed belt from cracking, various attempts have been made to improve the thermal resistance of the rubber itself, without necessarily using a rubber of a predetermined hardness at a low level. Conventionally, the best material having good thermal resistance characteristics is a rubber that mainly includes chloroprene.

Other kinds of improved rubbers have been developed wherein the rubbers are made mainly of such materials as chlorosulfuric polyethylene or sulfur-crosslinked, hydrogenated nitrile (unsaturated nitrile conjugated dien-based copolymer).

Further, it has hitherto been known as described in, for example, Japanese Patent Application Laid-open Nos. Hei 1-269743 or 5-164194, to provide a peroxide crosslinking-based hydrogenated nitrile rubber composition containing a carboxyl-terminated polybutadiene as a co-crosslinking agent.

Under those circumstances where improvement has been sought in the efficiencies of the parts for automobiles or in maintenance-free parts, although various attempts, as mentioned above, have been made to improve the toothed belt, the life span of the toothed belt by itself has not actually been prolonged as compared to that of the automobile as a whole.

One of the proposals to elongate the life span of the toothed belt has been to use the rubber composition with high hydrogenation rate in order to improve the thermal resistance. Japanese Patent Application Laid-open No. Hei 6-9822 discloses a rubber composition, wherein a sulfur-based crosslinking agent is added to a nitrile rubber with high hydrogenation rate, so that the thermal resistance can be improved without using a peroxide-based crosslinking agent. Having the advantage of crosslinking of the nitrile rubber with high hydrogenation rate, such a peroxide-based crosslinking agent has problems in that the manufacturing equipment for producing the toothed belts are vulnerable to the peroxide, and exchange of the consumption materials happens more often than compared to the case where the sulfur-based crosslinking agent is used.

Thus, the foregoing Japanese Patent Application Laid-open No. Hei 6-9822 discloses the invention of providing a crosslinking of the nitrile rubber with high hydrogenation by using the sulfur-based crosslinking agent, wherein dithiocarboxylic acid tellurate is used as a vulcanization accelerator, thereby improving the thermal resistance of the rubber composition.

However, such a rubber composition, when applied to the toothed belt, has not markedly improved the longevity thereof yet. Thus, a toothed belt, adaptable for a high-efficiency automobile, has not yet been obtained.

The present invention solves the above-mentioned problems. Thus, it is the object of the present invention to provide a toothed belt which gives high thermal resistance, wherein the improvement of a crosslinking performance of the hydrogenated nitrile rubber can be attained by improving the rubber compound used via the compounding ratio thereof.

SUMMARY OF THE INVENTION

To attain the above-mentioned objects, a toothed belt according to one preferred embodiment of the present invention includes a cured molding body, a tensile body embedded therewithin and a toothed sheet, said cured molding body compounding partial hydrogenated nitrile rubber with iodine value of from 12 to 20, a sulfur-based crosslinking agent and a vulcanization accelerator, wherein said vulcanization accelerator comprises:

tellurium dithiocarbamate compound represented by the following;

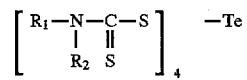

($R_1$, $R_2$: Alkyl group)

zinc dithiocarbamate compound represented by the following;

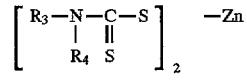

($R_3$, $R_4$: Alkyl group)

tetramethylthiuram disulfide and
tetraethylthiuram disulfide.

More preferably, in a more specific aspect of the invention, the toothed belt of the present invention includes 0.5 to 3.0 by weight of said tellurium dithiocarbamate compound, 0.3 to 0.5 by weight of said zinc dithiocarbamate compound, 1.5 to 3.0 by weight of said tetramethylthiuram disulfide, and 1.0 to 1.8 by weight of said tetraethylthiuram disulfide each compound per 100 by weight of partial hydrogenated nitrile rubber, so that the performance of belt is further improved.

Furthermore, it is preferable that tellurium diethyldithiocarbamate be suitable for tellurium dithiocarbamate compound, and zinc dimethyldithiocarbamate be suitable for zinc dithiocarbamate compound.

BRIEF DESCRIPTION OF THE DRAWINGS

The instant invention will be more fully described and better understood from the following description, taken with the appended drawings, in which.

DETAILED DESCRIPTION OF THE PREFERRED EMBODIMENTS

Figure 1:
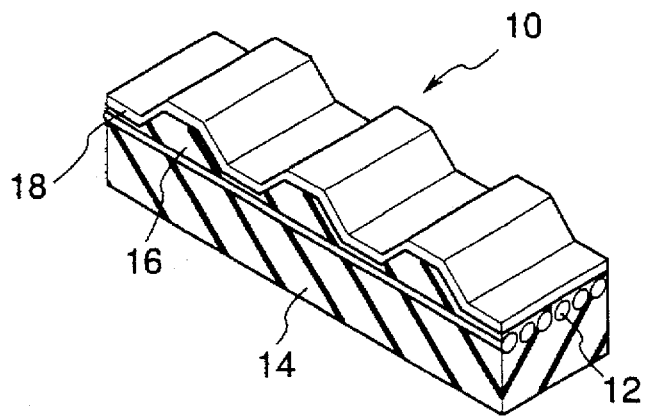
FIG. 1 is a perspective view of a toothed belt according to the present invention.
Figure 2:
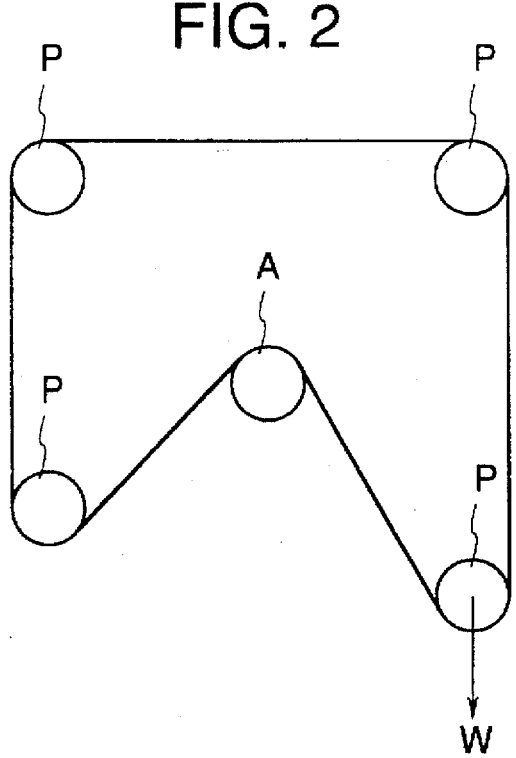
FIG. 2 is a schematic diagram of a condition of the thermal resistance test.
Figure 3:
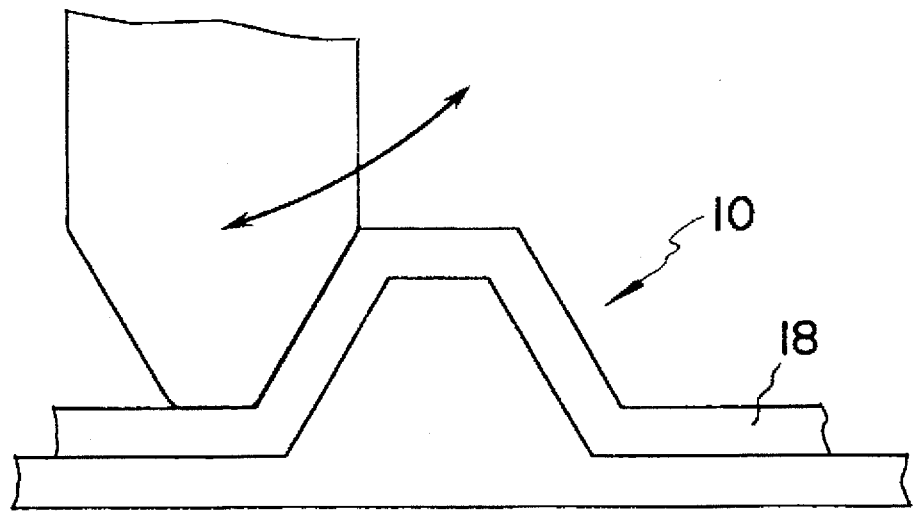
FIG. 3 is a schematic diagram of a condition of the test of performance to reduce possible tooth breakage.

As shown in FIG. 1, the toothed belt 10 according to the present invention comprises a back rubber 14 in which is embedded a tensile body (stem wire) 12, and toothed rubber 16, wherein a toothed sheet 18 is glued on an exposed toothed surface of the toothed rubber 16.

In producing the toothed belt of the present invention, the toothed sheet, impregnated with a rubber paste, is wound around a metal mold having a groove in the shape of a belt tooth. The tensile body is treated with adhesive and wound around the toothed sheet. An unvulcanized rubber compound sheet, made up of the toothed rubber and the back rubber, is wound around the tensile body. Then, the resulting component is formed and vulcanized in a pressure tank. Thereafter, the vulcanized component is taken out of the tank and cut out at equal intervals to provide a ring belt.

As for the tensile body, a twisted stem wire made of a material such as glass fiber, aramid fiber, or metal fiber, is usually used. Such a tensile body is impregnated with an adhesive aqueous solution before using. As for the adhesives, generally, an aqueous solution such as RFL is used, in which latex is mixed with an RF resin solution resulting from a chemical reaction between resorcinol and formalin.

Further, a tensile body, covered with an overcoating, such as a rubber paste, on the surface of the stem wire impregnated with the RFL, may be used.

As for the toothed sheet, a fabric is used which is made of a fiber, such as polyamide fiber, polyaramide fiber, or polyester fiber. Before the toothed sheet is adhered to the surface of the toothed rubber, the RFL treatment is performed, or a rubber paste, to which an organic compound with an isocyanato group is added, is impregnated into a rubber solution, in which hydrogenated nitrile rubber, similar to the rubber body, is dissolved with an organic solvent. Alternatively, the rubber paste treatment is performed after the RFL treatment. It is noted that in the latter case the organic compound with an isocyanato group is not necessarily added to the rubber paste.

Then, the toothed sheet is dried and treated. The reaction temperature of the toothed sheet ranges from temperature of about 150°–250° C. In addition, the rubber paste may be impregnated or coated therewith after the RFL treatment depending on the situation.

Furthermore, specific examples of the organic compound with an isocyanato group which may be used in the present invention include: polyphenyl isocyanato, triphenylmethane triisocyanato, tolylene diisocyanate, 4,4'-diphenylmethane diisocyanato, xylene diisocyanato, meta-xylene diisocyanato, hexamethylene diisocyanato, lysine isocyanate, 4,4'-methylenebis (cyclohexyl isocyanato), methylcyclohexane 2,4(2,6) diisocyanato, 1,3-(isocyanatomethyl) cyclohexane, isophorone diisocyanato, trimethyl hexamethylene diisocyanato, dimer acid isocyanate, and so forth.

The rubber composition includes a partial hydrogenated nitrile rubber, a sulfur-based crosslinking agent and a vulcanization accelerator. In addition, other compounding agents can be combined therewith so long as they do not lessen the effect sought by the present invention. For example, vulcanization accelerators, such as guanidine series, thiazol series, amidosulfenic series, or thiuram series other than the ones mentioned above, can be used. Further, a reinforcing agent, such as carbon black and calcium carbonate, an antioxidant, a zinc white, a plasticizer, a stearic acid and a wax, are used as usual.

The partial hydrogenated nitrile rubber intended for use has an iodine value ranging from 12 to 20, preferably 15 to 18. In view of the thermal resistance, according to the present invention, the hydrogenated nitrile rubber with hydrogenation rate of 93% is mainly used.

A crosslinking agent which may be used for the present invention includes a sulfur-based crosslinking agent. A peroxide-based crosslinking agent is not used. It is preferable that sulfur be used as the sulfur-based crosslinking agent.

Specific examples of a tellurium dithiocarbamate compound which may be used for the present invention include tellurium dimethyldithiocarbamate, tellurium diethyldithiocarbamate, tellurium diamyldithiocarbamate and the like. Of the above-mentioned tellurium dithiocarbamate compound, tellurium diethyldithiocarbamate is the most preferable.

It is preferable that tellurium dithiocarbamate compound be compounded in the weight ratio of from 0.5 to 3.0 to 100 of the hydrogenated nitrile rubber. The reason why the weight ratio should be kept within the foregoing range is that in the case where the compounding ratio of tellurium dithiocarbamate compound is less than 0.5 by weight, the crosslinking cannot be accelerated. While in the case where the compounding ratio thereof is more than 3.0 by weight, blooming occurs which looks like white powder is attached on the surface of the vulcanized rubber. This would not be preferable as a product.

Specific examples of a zinc dithiocarbamate compound which may be used for the present invention include: zinc dimethyldithiocarbamate, zinc diethyldithiocarbamate, zinc N-ethyl-N phenyldithiocarbamate, zinc N-pentamethyldithiocarbamete, zinc dibenzyldithiocarbamate, zinc dibutyldithiocarbamate and the like. Of the above-mentioned zinc dithiocarbamate compound, zinc dibutyldithiocarbamate is the most preferable.

Zinc dithiocarbamate compound, together with the foregoing tellurium dithiocarbamate compound, can improve the thermal resistance of the toothed belt.

It is preferable that the zinc dithiocarbamate compound be compounded in the weight ratio of from 0.3 to 0.5 to 100 of the hydrogenated nitrile rubber. The reason why the weight ratio should be kept within the foregoing range is that in the case where the compounding ratio of zinc dithiocarbamate compound is less than 0.3 by weight, the longevity of the toothed belt cannot be markedly prolonged. While in the case where the compounding ratio thereof is more than 0.5 in weight, blooming occurs which looks like a white powder attached to the surface of the vulcanized rubber.

Furthermore, the scorching time gets shortened thereby lessening the manufacturing stability.

It is preferable that tetramethylthiuram disulfide be compounded in the weight ratio of from 1.5 to 3.0 to 100 of the hydrogenated nitrile rubber. The reason why the weight ratio should be kept within the foregoing range is that in the case where the compounding ratio of tetramethylthiuram disulfide is less than 1.5 by weight, the longevity of the toothed belt cannot be markedly prolonged. While in the case where the compounding ratio thereof is more than 3.0 by weight, blooming occurs on a vulcanized rubber.

It is preferable that tetraethylthiuram disulfide be compounded in the weight ratio of from 1.0 to 1.8 to 100 of the hydrogenated nitrile rubber. The reason why the weight ratio should be kept within the foregoing range is that in the case where the compounding ratio of tetraethylthiuram disulfide is less than 1.0 by weight, the longevity of the toothed belt cannot be remarkably prolonged. While in the case where the compounding ratio thereof is more than 1.8 in weight, blooming occurs on the surface of the vulcanized rubber thereby degrading its appearance.

Preferred embodiments of the present invention will now be described in detail with reference to the accompanying drawings and tables.

TABLE 1 shows a compound example of the rubber composition for the toothed belt according to the present invention. EXAMPLES 1 to 6 show compound examples of the rubber composition adapted for the present invention. COMPARATIVE EXAMPLES 1 to 6 show compound examples of the rubber composition for ascertaining the effect of the toothed belt according to the present invention. CONVENTIONAL EXAMPLES 1 to 3 show compound examples of the hydrogenated nitrile rubber with hydrogenation rate of 90%. TABLE 2 shows the performance of the belt and test results obtained by the toothed belts manufactured with the rubber composition according to the EXAMPLE, COMPARATIVE EXAMPLE and CONVENTIONAL EXAMPLE.

TABLE 1

| COMPOUNDING AGENT | | EXAMPLE 1 | 2 | 3 | 4 | 5 | 6 | COMPARATIVE EXAMPLE 1 | 2 | 3 | 4 | 5 | 6 | CONVENTIONAL EXAMPLE 1 | 2 | 3 |
|---|---|---|---|---|---|---|---|---|---|---|---|---|---|---|---|---|
| Polymer | ZETPOL 2020 Note 1) | | | | | | | | | | | | | 100 | 100 | 100 |
| | ZETPOL 2011 Note 2) | 100 | 100 | 100 | 100 | | | 100 | 100 | 100 | 100 | 100 | 100 | | | |
| | ZETPOL 3110 Note 3) | | | | | 100 | | | | | | | | | | |
| | ZETPOL 4110 Note 4) | | | | | | 100 | | | | | | | | | |
| Vulcanizing Agent Sulphur | | 0.8 | 0.8 | 0.8 | 0.8 | 0.8 | 0.8 | 0.8 | 0.8 | 0.8 | 0.8 | 0.8 | 0.8 | 0.8 | 1.6 | 0.8 |
| Vulcanization Accelerator | | | | | | | | | | | | | | | | |
| Tetramethylthiuram disulfide(TMTD) | | 2.0 | 2.0 | 2.0 | 2.0 | 2.0 | 2.0 | 1.0 | 1.5 | 1.0 | 2.0 | 1.0 | 1.0 | 2.0 | 3.0 | 2.0 |
| Tetraethylthiuram disulfide(TETD) | | 1.8 | 1.8 | 1.8 | 1.0 | 1.8 | 1.8 | 2.0 | | 1.8 | 1.8 | 2.0 | 2.0 | 2.0 | 2.0 | 2.0 |
| Tellurium diethyldithio-carbamate(TTTe) | | 2.0 | 1.0 | 2.0 | 2.0 | 2.0 | 2.0 | 2.0 | 2.0 | 2.0 | 2.0 | | | | | |
| 2-Mercaptobenzothiazole(MBT) | | | | | | | | | 0.5 | | | | | | | |
| Zinc dibutyldithiocarbamate(BZ) | | 0.5 | 0.5 | 0.3 | 0.5 | 0.5 | 0.5 | | | 0.5 | 0.2 | 0.5 | 1.0 | | | |
| Carbon Black N550 | | 50 | 50 | 50 | 50 | 50 | 50 | 50 | 50 | 50 | 50 | 50 | 50 | 50 | 50 | 50 |
| Antioxidant | | 5 | 5 | 5 | 5 | 5 | 5 | 5 | 5 | 5 | 5 | 5 | 5 | 5 | 5 | 5 |
| Zinc White | | 5 | 5 | 5 | 5 | 5 | 5 | 5 | 5 | 5 | 5 | 5 | 5 | 5 | 5 | 5 |
| Plasticizer | | 10 | 10 | 10 | 10 | 10 | 10 | 10 | 10 | 10 | 10 | 10 | 10 | 10 | 10 | 10 |
| Stearic Acid | | 1 | 1 | 1 | 1 | 1 | 1 | 1 | 1 | 1 | 1 | 1 | 1 | 1 | 1 | 1 |
| Wax | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

Note 1–4) Hydrogenated NBR Rubber manufactured by Nippon Zeon Co., Ltd.

| Note | 1) | 2) | 3) | 4) |
|---|---|---|---|---|
| Hydrogenation Rate (%) | 90 | 93 | 93 | 93 |
| Iodine Value | 28 | 18 | 15 | 15 |
| Amount of Nitrile | 36 | 36 | 25 | 17 |

TABLE 2

| EVALUATION ITEM | | | EXAMPLE 1 | 2 | 3 | 4 | 5 | 6 | COMPARATIVE EXAMPLE 1 | 2 | 3 | 4 | 5 | 6 | CONVENTIONAL EXAMPLE 1 | 2 | 3 |
|---|---|---|---|---|---|---|---|---|---|---|---|---|---|---|---|---|---|
| Performance of | Unvulcanized Mooney scorching ML 130° C. t5 | min | 10.0 | 11.0 | 13.0 | 9.5 | 9.8 | 9.6 | 19.4 | 6.8 | 13.6 | 14.1 | 7.3 | 5.9 | 11.0 | 12.7 | 12.5 |
| | Normal Condition | | | | | | | | | | | | | | | | | |
| Rubber as a Simple Substance | Rubber Hardness (Hs) | JIS-A | 72 | 72 | 71 | 72 | 72 | 72 | 72 | 72 | 71 | 69 | 72 | 72 | 69 | 71 | 76 |
| | Tension Strength (TB) | kgf/cm$^2$ | 232 | 229 | 233 | 231 | 233 | 230 | 221 | 230 | 239 | 238 | 219 | 218 | 209 | 203 | 214 |
| | Elongation (EB) | % | 470 | 485 | 488 | 476 | 473 | 469 | 490 | 460 | 477 | 499 | 463 | 454 | 538 | 524 | 414 |

TABLE 2-continued

| | | | EXAMPLE | | | | | | COMPARATIVE EXAMPLE | | | | | | CONVENTIONAL EXAMPLE | | |
|---|---|---|---|---|---|---|---|---|---|---|---|---|---|---|---|---|---|
| EVALUATION ITEM | | | 1 | 2 | 3 | 4 | 5 | 6 | 1 | 2 | 3 | 4 | 5 | 6 | 1 | 2 | 3 |
| | 100% Modulus | kgf/cm² | 39 | 38 | 38 | 39 | 40 | 38 | 33 | 37 | 36 | 34 | 39 | 42 | 25 | 36 | 44 |
| | Tear Resistance (TR) | kgf/cm² | 59 | 60 | 60 | 59 | 61 | 59 | 56 | 58 | 59 | 63 | 56 | 57 | 60 | 62 | 60 |
| | Thermal Resistance (Aging after 140° C. × 288 hrs.) | | | | | | | | | | | | | | | | |
| | Rubber Hardness (Hs) | JIS-A | 84 | 84 | 83 | 84 | 84 | 84 | 84 | 84 | 84 | 82 | 84 | 85 | 84 | 85 | 89 |
| | Tension Strength (TB) | kgf/cm² | 219 | 217 | 218 | 220 | 219 | 218 | 227 | 191 | 218 | 216 | 193 | 187 | 176 | 196 | 200 |
| | Elongation (EB) | % | 257 | 266 | 269 | 251 | 250 | 247 | 202 | 210 | 232 | 218 | 191 | 183 | 157 | 154 | 124 |
| | 100% Modulus | kgf/cm² | 98 | 99 | 98 | 101 | 101 | 99 | 108 | 107 | 101 | 103 | 113 | 116 | 108 | 119 | 133 |
| | Tear Resistance (TR) | kgf/cm² | 58 | 59 | 58 | 57 | 59 | 58 | 57 | 57 | 59 | 61 | 55 | 53 | 37 | 38 | 41 |
| | Compression set (25% Compression 120° C. × 144 hrs.) | % | 51 | 53 | 56 | 55 | 52 | 51 | 69 | 61 | 76 | 67 | 64 | 62 | 63 | | |
| Performance of Belt | Test A (Thermal Resistance) Longevity of Belt | 140° C. Hrs. | 681 | 690 | 683 | 677 | 679 | 669 | 572 | 589 | 613 | 596 | 583 | — | 515 | 565 | 488 |
| | Test B (Performance to Reduce Possible Tooth Breakage) Longevity of Belt | 100° C. Hrs. | 212 | 188 | 192 | 186 | 189 | 195 | 118 | 101 | 84 | 99 | 117 | — | 71 | 107 | 143 |

Performance of a belt is measured with respect to thermal resistance and performance to reduce possible tooth breakage. The method of measurement is as follows:

Performance of thermal resistance is measured by a thermal resistant running test (hereinafter referred to as "Test A"), wherein a tested belt is made to run, with a constant tension of 15 kgf, 400 revolutions per minutes, at an ambient temperature around the running belt of 140° C. by constantly supplying fresh hot wind using a testing machine including a driving pulley with nineteen teeth (8 mm pitch), a driven pulley with nineteen teeth, and an idler with a diameter of 45 mm. The time prior to cracking of the back surface of the tested belt or the root portion of the tooth, is measured.

Performance to reduce possible tooth breakage is measured by a test measuring the performance to reduce possible tooth breakage (hereinafter referred to as "Test B"), wherein a tooth of a tested belt with a width of 19.05 mm is made to load, with 25 kgf of repeated shearing force at an interval of 500 times per minutes, in a direction orthogonally from the width direction of the belt, under an atmosphere of 100° C. The time, prior to the breakage of a tooth of the belt, is measured.

As will be apparent from TABLE 2 as compared to each of the CONVENTIONAL EXAMPLES 1 through 3, the toothed belt according to the present invention (EXAMPLES 1 to 6) has high values both in thermal resistance and in performance to reduce possible tooth breakage.

The foregoing COMPARATIVE EXAMPLES 1 and 2 are the toothed belts resulting from the rubber composition without including zinc dithiocarbamate compound, each of which corresponds to the rubber composition described in the foregoing Japanese Patent Application Laid-open No. Hei 6-9822. The performance of the belt did not markedly improve in those toothed belts as compared to the CONVENTIONAL EXAMPLE.

The foregoing COMPARATIVE EXAMPLES 5 and 6 are where zinc dithiocarbamate compound is compounded instead of tellurium dithiocarbamate compound. The toothed belts resulting from the rubber composition of the foregoing EXAMPLES do not perform well. The rubber compositions according to COMPARATIVE EXAMPLES 5 and 6 are disadvantageous in moldability due to the shortening of the scorching time. Especially, the rubber composition according to COMPARATIVE EXAMPLE 6 could not be molded to be a toothed belt.

Accordingly, in a vulcanization accelerator which uses exclusively tellurium dithiocarbamate compound or zinc dithiocarbamate compound, it is considered that vulcanization of the sulfur-based crosslinking agent cannot be sufficiently promoted. However, in the case where tellurium dithiocarbamate compound and zinc dithiocarbamate compound, each serving as a vulcanization accelerator, are compounded, a synergism seems to arise. The theoretical reasons for this synergism are at present unexplainable.

Next, in COMPARATIVE EXAMPLE 4 where zinc dithiocarbamate compound is compounded in the weight ratio of 0.2, neither the thermal resistance nor the performance to reduce possible tooth breakage has not been improved markedly. On the other hand, in the case where the compounding ratio thereof is more than 0.5, blooming occurs on the vulcanized rubber so that the appearance thereof is degraded. In addition to this, in the case of more than 0.5 by weight, the scorching time is shortened, thereby degrading the manufacturing stability. Accordingly, it is preferable that the compounding ratio of zinc dithiocarbamate compound be from 0.3 to 0.5 by weight.

In COMPARATIVE EXAMPLE 3 wherein tetramethylthiuram disulfide is compounded in the weight ratio of 1.0, the performance of the belt did not markedly improve. More particularly, the performance to reduce possible tooth breakage did not improve. Further, compression deformation strain grows so that the toothed belt therefrom is useless. On the other hand, in the case where the compounding ratio of tetramethylthiuram disulfide is more than 3.0 by weight, blooming occurs on the vulcanized rubber resulting in a degradation of the appearance thereof. Accordingly, it is preferable that the compounding ratio of tetramethylthiuram disulfide be from 0.3 to 0.5 by weight.

As will be apparent from EXAMPLE 4, tetraethylthiuram disulfide, the compounding ratio of which is 1.0 by weight, markedly improved, at least, the performance of the belt. However, in the case where the compounding ratio of tetraethylthiuram disulfide is more than 1.8 by weight, blooming occurs on the vulcanized rubber, thereby degrading the appearance thereof. Accordingly, it is preferable that the compounding ratio of tetraethylthiuram disulfide be from 1.0 to 1.8 by weight.

As will be understood from the foregoing description, according to the toothed belt of the present invention, because not only tetramethylthiuram disulfide, tetraethylthiuram disulfide, tellurium dithiocarbamate compound, but also zinc dithiocarbamate compound is used for a vulcanization accelerator, the thermal resistance and the performance to reduce possible tooth breakage, which could not be sufficiently solved solely by tellurium dithiocarbamate compound, can be improved and particularly with respect to the longevity of the belt.

Further, the thermal resistance and the performance to reduce possible tooth breakage can assuredly be improved, by compounding the rubber composition in a specified ratio range.

Further, the thermal resistance and the performance to reduce possible tooth breakage can assuredly be improved, by compounding a specified rubber composition.

While the instant invention has been shown and described with specific reference to embodiments presently contemplated as the best mode of carrying out the invention in actual practice, it is to be understood that various changes may be made in adapting the invention to different embodiments without departing from the broader inventive concepts disclosed herein and comprehended by the claims which follow.

What is claimed is:

1. A toothed belt including a cured molding body, a tensile body embedded therewithin and a tooth sheet, said cured molding body compounding partial hydrogenated nitrile rubber with iodine value of from 12 to 20, a sulfur-based crosslinking agent and a vulcanization accelerator, wherein said vulcanization accelerator comprises:

tellurium dithiocarbamate compound represented by the following;

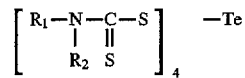

($R_1$, $R_2$: Alkyl group)

zinc dithiocarbamate compound represented by the following;

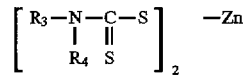

($R_3$, $R_4$: Alkyl group)

tetramethylthiuram disulfide; and
tetraethylthiuram disulfide.

2. The toothed belt as recited in claim 1, comprising 0.5 to 3.0 by weight of said tellurium dithiocarbamate compound, 0.3 to 0.5 by weight of said zinc dithiocarbamate compound, 1.5 to 3.0 by weight of said tetramethylthiuram disulfide, and 1.0 to 1.8 by weight of said tetraethylthiuram disulfide each compounded per 100 by weight of partial hydrogenated nitrile rubber.

3. The toothed belt as recited in claim 1 or 2, wherein said tellurium dithiocarbamate compound includes tellurium diethyldithiocarbamate, and said zinc dithiocarbamate compound includes zinc dimethyldithiocarbamate.

* * * * *